(12) United States Patent
Blankemeier et al.

(10) Patent No.: US 10,208,869 B2
(45) Date of Patent: Feb. 19, 2019

(54) MULTI-PIECE CANISTER ASSEMBLY FOR MAGNETICALLY COUPLED FLUID HANDLING DEVICES

(71) Applicant: PEOPLEFLO MANUFACTURING, INC., Franklin Park, IL (US)

(72) Inventors: William R. Blankemeier, Oak Park, IL (US); Clark J. Shafer, Bolingbrook, IL (US); Daniel Turner, Villa Park, IL (US); Kris Malorny, Downers Grove (IL)

(73) Assignee: PEOPLEFLO MANUFACTURING, INC., Franklin Park, IL (US)

( * ) Notice: Subject to any disclaimer, the term of this patent is extended or adjusted under 35 U.S.C. 154(b) by 67 days.

(21) Appl. No.: 15/383,936

(22) Filed: Dec. 19, 2016

(65) Prior Publication Data

US 2018/0172011 A1    Jun. 21, 2018

(51) Int. Cl.
| | | |
|---|---|---|
| *F04C 2/00* | (2006.01) | |
| *F04D 13/02* | (2006.01) | |
| *F16K 31/06* | (2006.01) | |
| *F04C 15/00* | (2006.01) | |

(52) U.S. Cl.
CPC ............... *F16K 31/06* (2013.01); *F04C 2/00* (2013.01); *F04D 13/026* (2013.01); *F04C 15/0069* (2013.01)

(58) Field of Classification Search
CPC ............. F04D 13/0606; F04D 13/0626; F04D 13/021; F04D 13/024; F04D 13/025; F04D 13/026; F04C 13/024; F04C 2240/60; F04C 2/101; F04C 15/0069; F04C 15/0061; F01C 1/10; F01C 1/18; F01C 1/24

USPC .......................................................... 417/420
See application file for complete search history.

(56) References Cited

U.S. PATENT DOCUMENTS

| | | | |
|---|---|---|---|
| 3,309,009 A | | 3/1967 | Culk |
| 3,608,088 A | * | 9/1971 | Dorman ............... F04D 13/026 |
| | | | 128/899 |
| 4,890,988 A | | 1/1990 | Kramer et al. |
| 4,952,429 A | | 8/1990 | Schmitz et al. |
| 5,308,229 A | * | 5/1994 | DuPuis ............... F04C 15/0038 |
| | | | 417/368 |
| 5,683,300 A | | 11/1997 | Yasui et al. |
| 5,763,973 A | | 6/1998 | Cramer |
| 6,039,827 A | | 3/2000 | Cramer |
| 6,293,772 B1 | | 9/2001 | Brown et al. |
| 6,445,098 B1 | | 9/2002 | Materne |

(Continued)

OTHER PUBLICATIONS

Search Report and Written Opinion for PCT/US2017/062597 dated Feb. 9, 2018.

*Primary Examiner* — Philip Stimpert
(74) *Attorney, Agent, or Firm* — Cook Alex Ltd.

(57) ABSTRACT

The present disclosure provides a multi-piece containment canister assembly for use in magnetically coupled fluid handling devices such as rotary pumps, mixers, flowmeters or valves. The canister assembly includes a generally tubular single-piece body and an end cap that are sealingly fastened together to form a generally cup-shaped canister. The canister body may be made of strong, non-conductive or low conductive materials, such that it greatly reduces eddy currents. The generally tubular shape of the canister body is easier, and therefore less costly to manufacture than typical cup-shaped canisters.

30 Claims, 10 Drawing Sheets

(56) References Cited

U.S. PATENT DOCUMENTS

| | | | |
|---|---|---|---|
| 7,001,063 | B1 | 2/2006 | Markle |
| 7,249,939 | B2 | 7/2007 | Yanagihara et al. |
| 8,459,101 | B2 | 6/2013 | Stevenson |
| 8,883,060 | B2 * | 11/2014 | Nakamura .............. B29C 70/32 156/173 |
| 8,956,067 | B2 | 2/2015 | Schneider et al. |
| 8,957,552 | B2 | 2/2015 | Hansen et al. |
| 9,011,623 | B2 | 4/2015 | Kenney et al. |
| 9,071,091 | B2 | 6/2015 | D'Antonio |
| 9,133,965 | B2 | 9/2015 | Goering et al. |
| 2004/0223864 | A1 | 11/2004 | Miller et al. |
| 2005/0220653 | A1 | 10/2005 | Schafer et al. |
| 2012/0177511 | A1 | 7/2012 | Sexton et al. |
| 2013/0180194 | A1 | 7/2013 | Langone et al. |
| 2013/0221769 | A1 | 8/2013 | Hansen et al. |
| 2014/0234142 | A1 | 8/2014 | Mischiatti et al. |
| 2015/0206337 | A1 | 7/2015 | Roimela |
| 2015/0260191 | A1 | 9/2015 | Blankemeier et al. |
| 2016/0305433 | A1 | 10/2016 | Eschner |

\* cited by examiner

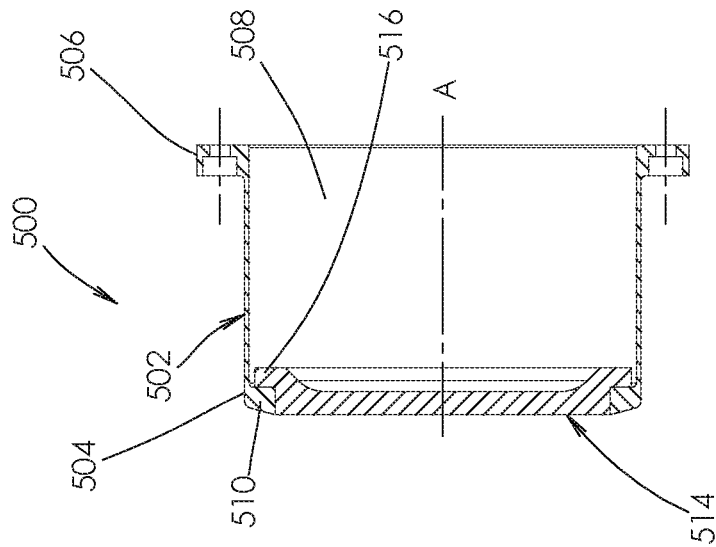
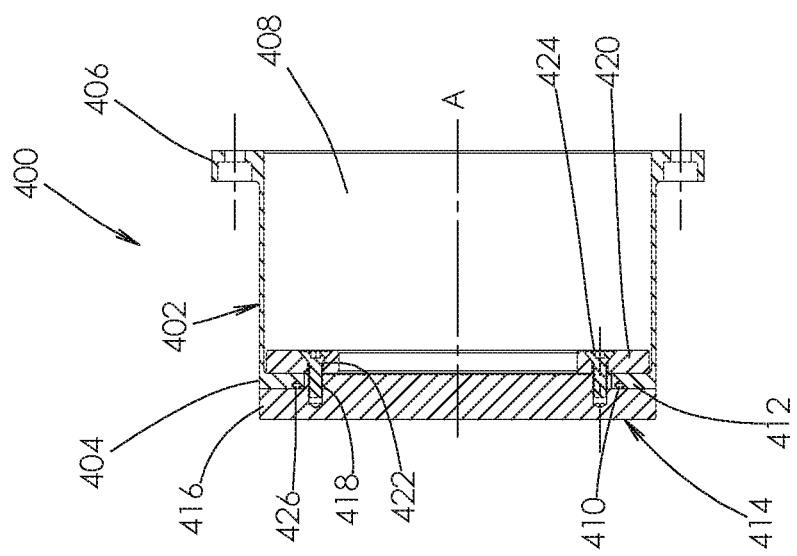
FIG. 9
FIG. 10

MULTI-PIECE CANISTER ASSEMBLY FOR MAGNETICALLY COUPLED FLUID HANDLING DEVICES

BACKGROUND

Field of the Invention

The present invention generally relates to containment canisters used in magnetically coupled fluid handling devices such as rotary pumps, mixers, flowmeters or valves.

Description of the Related Art

In rotary fluid handling devices, magnetic couplings are commonly used to prevent fluid from leaking around the rotating drive shaft. These magnetic couplings typically consist of three main components; a larger, outer rotating coupling component with multiple magnets on its inner surface, a smaller, inner rotating coupling component with multiple magnets on its outer surface, and a stationary containment canister, generally cup-shaped, separating the inner and outer components and forming a stationary fluid chamber barrier.

The magnets on the inner and outer components are axially aligned and a magnetic field synchronizes the rotation of the two components, such that as one component is rotated, the other component is forced to rotate. But neither component physically touches the other, and they rotate in separate environments, separated by the canister. These magnetic couplings generally fall into one of two arrangements.

The first and most common arrangement is commonly called an outer drive arrangement, where; the outer coupling component is outside of the device's fluid chamber, and is driven by an external power source, such as a motor; the inner coupling component is inside the device's fluid chamber and is connected to the equipment's rotor; the containment canister is a boundary of the device's fluid chamber, and the fluid chamber is inside the canister.

Although less common, some devices have a second arrangement commonly called an inner drive arrangement, which utilizes the same three main components, except the roles are reversed. The inner coupling component is outside of the device's fluid chamber, and is driven by an external power source, such as a motor; the outer coupling component is inside the device's fluid chamber and is connected to the equipment's rotor; the containment canister is a boundary of the device's fluid chamber, and the fluid chamber is outside the canister.

Typically, the canister is of a one-piece design generally shaped like a cup, including a thin tubular portion disposed within a radial gap between the inner and outer magnets and having an end cap portion closing off one end of the tubular portion. Generally the other end of the tubular portion is open to receive the inner coupling component and is sealingly connected to the device's casing to form and define a portion of the fluid chamber. The canister must be designed to withstand the maximum anticipated pressure of the device's fluid chamber.

The amount of torque that a radial magnetic coupling can generate is related to the radial gap or distance between the inner and outer magnets, where the torque increases as the gap decreases. Therefore it is advantageous to minimize the gap, so that one can obtain the greatest torque possible. In most cases, the canister is made of metal, since metal allows for a strong yet thin design. But this has a disadvantage; most metals are good electrical conductors. For instance, common metal materials for a canister may include 316 stainless steel or 304 stainless steel, which have an electrically conductivity level of roughly 1,300,000 Siemens per meter (S/m) and 1,400,000 S/m, respectively. When using such common metal materials for a canister, electrical eddy currents are created in the metal canister by the rotating magnetic field when the coupling is rotating. The eddy currents convert some of the transmitted power into heat, which wastes power and often has detrimental effects on the device and/or the fluid within the device, which may be referred to as the pumped fluid. With some pump designs, additional measures must be taken to deal with the detrimental eddy currents, such as adding cooling systems.

Some one-piece canister designs use non-conductive or low conductive materials, such as ceramics or structural composites, instead of metal. They have an advantage in that they greatly reduce eddy currents. But they have a disadvantage in that they often are difficult and costly to manufacture, due to the necessary generally cup-like shape of the canister.

Some canisters, particularly in outer-drive arrangements, incorporate a multi-layered design to increase the canister strength. An inner layer generally is made of a material that is chemically resistant to the intended pumped fluid, but may have relatively low strength. The outer layer is not in contact with the pumped fluid, so it can be made from a wider choice of materials, such as a much stronger material to reinforce the inner layer. But these designs are inherently more expensive due to their complexity, and may be thicker, reducing the torque.

Generally the only function of the canister end cap is to close off one end of the canister, but in some cases, the end cap additionally may be used to provide support for the rotor. This may provide an advantage of a simpler and smaller overall design, however, such support adds additional complexity to the canister, further increasing the manufacturing difficulty and cost of the canister when using non-conductive materials.

Thus, there is a need in the industry for a canister design that includes a tubular portion that is thin, strong and generates zero or very low eddy currents, yet is easier and less costly to manufacture.

SUMMARY

The present disclosure provides a multi-piece containment canister for use in magnetically coupled fluid handling devices such as rotary pumps, mixers, flowmeters or valves. The canister includes two main components; a generally tubular single-piece body and an end cap that together form a generally cup-shaped canister.

The canister body can be made of strong, non-conductive or low conductive materials, such that it generates zero or greatly reduced eddy currents in the presence of a rotating magnetic field. The generally tubular shape of the canister body is easier, and therefore less costly to manufacture than typical one-piece cup-shaped canisters or multi-layered canisters.

The canister end cap is sealingly connected to a flange at one end of the canister body, closing off that end. The canister end cap may be made of any suitable material, including metals that have high electrical conductivity, because the canister end cap is not in proximity to the rotating magnetic field of the magnetic coupling, and therefore, will not generate eddy currents.

In a first aspect, the disclosure provides a magnetically driven fluid handling device comprising: a stationary casing having a front portion, a rear portion, a discharge port, and an inlet port; a rotatable rotor assembly having a plurality of magnet segments; a rotatable drive magnet assembly having a plurality of magnet segments in axial alignment with the magnet segments of the rotor assembly; a stationary canister assembly of multi-piece construction further comprising an end cap and a body that is generally tubular, with the body being disposed within a radial gap between the magnet segments of the rotor assembly and the magnet segments of the drive magnet assembly; wherein the body has a central axis and further comprises a central cavity that is open at opposed first and second ends, with a dimension RMAX defined by a radial distance from the central axis to a point on the body farthest away from the central axis, and a dimension RMIN defined by a radial distance from the central axis to a point on the body nearest to the central axis, wherein the dimensions RMIN and RMAX have a ratio of RMIN to RMAX that is at least 0.5, and the body is constructed of a single piece of material; and wherein the body further comprises a flange at the first end, and the end cap is fastened to and sealingly closes the central cavity at the flange at the first end of the body, and wherein the canister assembly is sealingly attached to the casing at the second end of the body, and the canister assembly separates a fluid chamber within the casing from the drive magnet assembly.

In a second aspect, the disclosure provides a canister assembly for a magnetically driven fluid handling device, said canister assembly being of multi-piece construction and comprising: an end cap and a body that is generally tubular; the body having a central axis and a central cavity that is open at opposed first and second ends, with a dimension RMAX defined by a radial distance from the central axis to a point on the body farthest away from the central axis, and a dimension RMIN defined by a radial distance from the central axis to a point on the body nearest to the central axis, wherein the dimensions RMIN and RMAX have a ratio of RMIN to RMAX that is at least 0.5, and the body is constructed of a single piece of material; and wherein the body further comprises a flange at the first end, and the end cap is fastened to and sealingly closes the central cavity at the flange at the first end of the body.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein:

FIG. 9 shows a sectioned view of a fourth example canister assembly.

FIG. 10 shows a sectioned view of a fifth example canister assembly.

Figure 1:
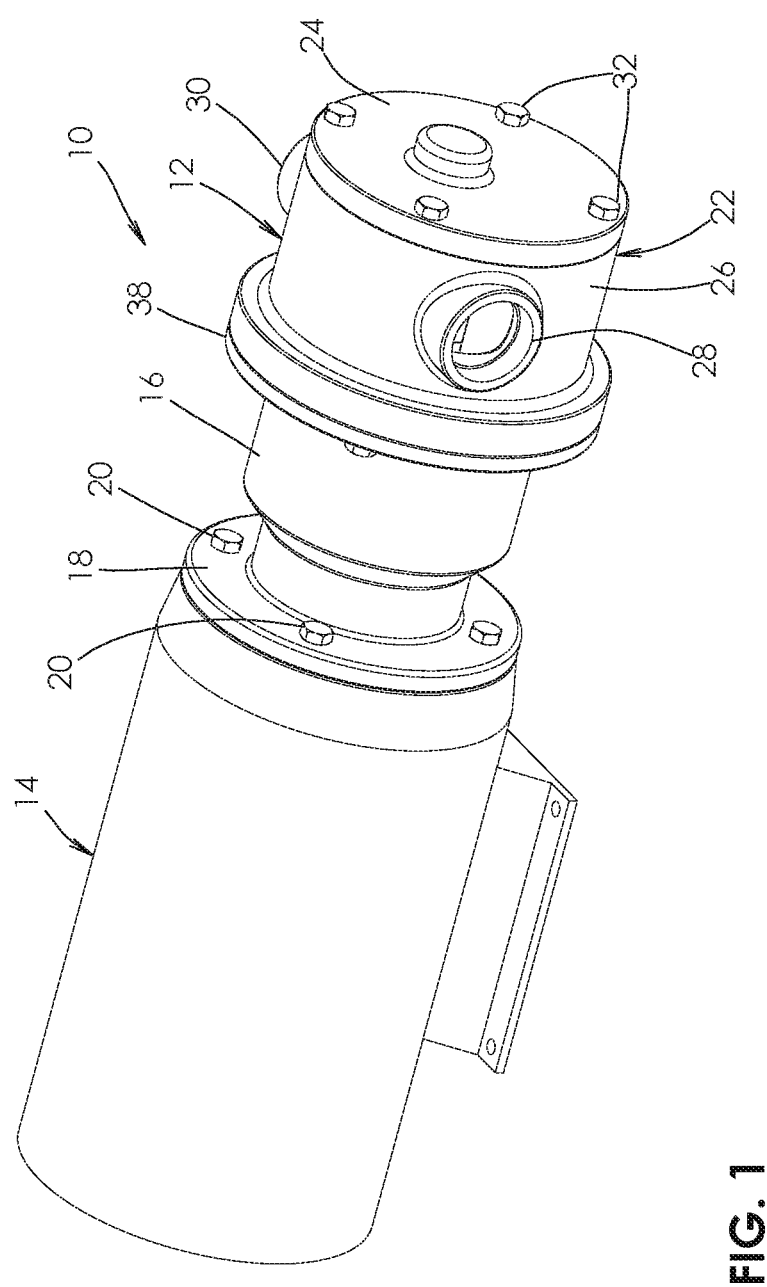
FIG. 1 shows a perspective view of a first example fluid handling device, in a configuration of a gear pump.
Figure 2:
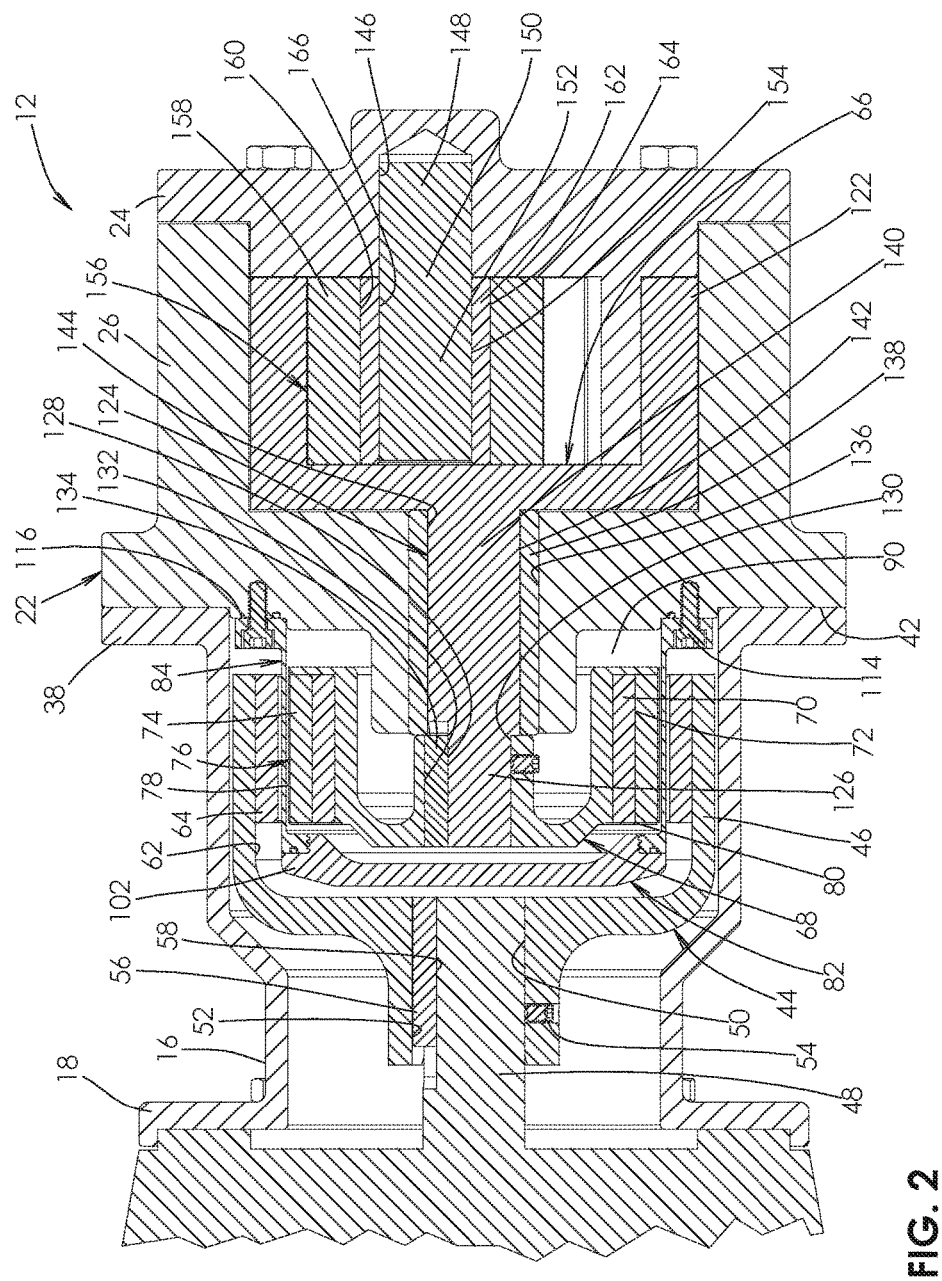
FIG. 2 shows a section view of the first example device of FIG. 1.
Figure 3:
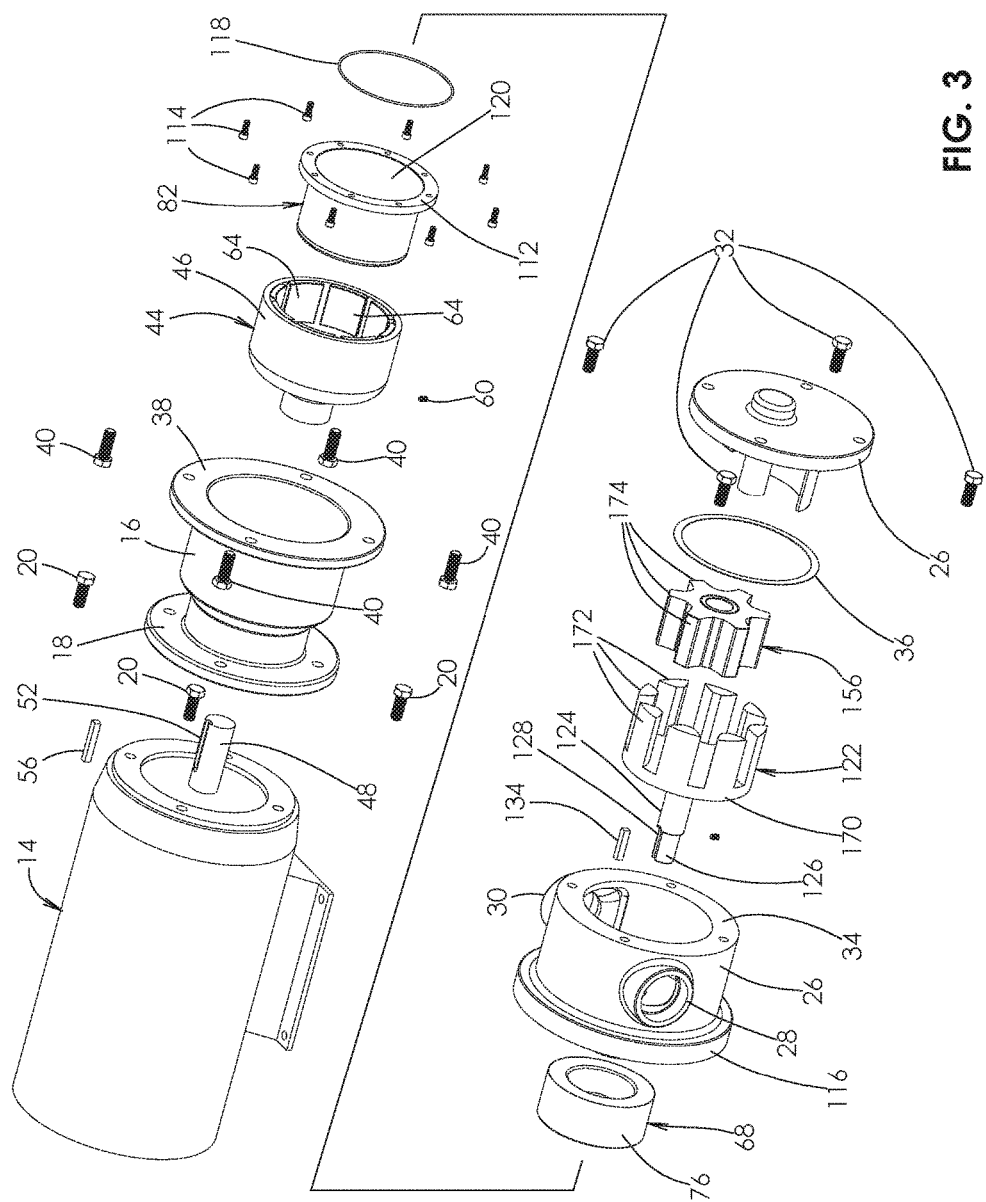
FIG. 3 shows a perspective exploded view of the first example device of FIG. 1 having a first example canister assembly.

It should be understood that the drawings are not to scale. While some mechanical details of the example fluid handling devices, including details of fastening means and other plan and section views of the particular components, have not been shown, such details are considered to be within the comprehension of those skilled in the art in light of the present disclosure. It also should be understood that the present disclosure and claims are not limited to the preferred embodiments illustrated.

DETAILED DESCRIPTION

Referring generally to FIGS. 1-14, it will be appreciated that canisters of the present disclosure generally may be embodied within numerous configurations. Indeed, the teachings within this disclosure may pertain to canisters used in magnetically coupled pumps, mixers, flowmeters or valves. The magnetic couplings may be of an inner drive or outer drive arrangement, and the canister end cap may or may not provide support for the rotor.

Referring to a preferred first example embodiment, in FIGS. 1-6, an example magnetically coupled fluid handling device 10 is shown in the form of a pump 12 connected to a standard C-face electric motor 14. The configuration of pump 12 happens to be a gear pump with a magnetic coupling of an outer drive arrangement, and where a canister end cap does not provide support for a rotor. Pump 12 includes a motor adapter 16 having a first or rear flange 18 that extends outward and is connected to the motor 14 by use of a plurality of fasteners 20, such as threaded screws or other suitable means of connection.

The pump 12 includes a casing 22 that is intended to be mounted in place, so as to be stationary. The casing 22 includes a front portion 24 and a rear portion 26. The casing rear portion 26 also has an outlet or discharge port 28 and an inlet port 30. The casing front portion 24 and casing rear portion 26 are connected together by use of a plurality of fasteners 32 that pass through apertures in the casing front portion 24 and engage threaded holes in a front surface 34 of the casing front portion 24. Sealing is provided between the casing front portion 24 and the casing rear portion 26 by an o-ring 36, although other methods of sealing may be employed, such as use of a gasket, liquid sealant or the like.

The motor adapter 16 has a second or front flange 38 that extends outward. The casing rear portion 26 and motor adapter 16 are connected together by use of a plurality of fasteners 40 that pass through apertures in the motor adapter front flange 38 and engage threaded holes in a rear surface 42 of the casing rear portion 26. The casing front portion 24, casing rear portion 26 and motor adapter 16 may be constructed of rigid materials, such as steel, stainless steel, cast iron or other metallic materials, or structural plastics or the like.

The pump 12 further includes a rotatable drive magnet assembly, such as an outer magnet assembly 44 that includes an outer ring 46 connected directly to a shaft 48 of the motor 14. Outer ring 46 includes an inner opening 50 that slidably receives the motor shaft 48. The outer ring 46 also includes a keyway 52 and one or more threaded apertures 54. A key 56 is positioned in the outer ring keyway 52 and engages with a keyway 58 of the motor shaft 48, to provide a positive rotational connection between the outer ring 46 and the motor shaft 48. One or more setscrews 60 are positioned in the outer ring threaded apertures 54 and are tightened against the motor shaft 48, to provide a positive axial connection between the outer ring 46 and the motor shaft 48. The outer ring 46 may be constructed of rigid materials, but is preferably constructed of a material with high magnetic permeability, such as iron, carbon steel or the like.

The outer ring 46 of the drive magnet assembly, such as outer magnet assembly 44 includes an inner surface 62 to which are connected eight magnet segments 64, although it will be appreciated that one may construct an embodiment with a different quantity of magnet segments. The magnet segments 64 are radially charged and are positioned with alternating polarity. The magnet segments 64 are rigidly connected to the outer ring 46 using an adhesive, although alternative suitable means of connection may be used, such as use of fasteners or the like.

The pump 12 also includes a rotatable rotor assembly 66 that includes an inner magnet assembly 68 having an inner ring 70. The inner ring 70 includes an outer surface 72, to which are connected eight magnet segments 74, which corresponds to the number of outer magnet segments 64 connected to the outer ring 46, although it will be appreciated that one may construct an embodiment with a greater or lesser quantity of magnet segments. The magnet segments 74 are radially charged and are positioned with alternating polarity. The magnet segments 74 are rigidly connected to the inner ring 70 using an adhesive, although alternative suitable means of connection may be used, such as use of fasteners or the like. An inner magnet sleeve 76 is included having a thin cylindrical portion 78 that closely fits along the outer surfaces of the magnet segments 74. The inner magnet sleeve 76 also includes a rear flange 80 that extends inward. The inner magnet sleeve 76 is sealingly connected to the inner ring 70 by continuous weld joints located at an inner end of the rear flange 80 and at a front end of the cylindrical portion 78. It will be appreciated by one of skill in the art that other methods of connection may be used, such as liquid adhesive, gaskets, o-rings or the like. The inner ring 70 may be constructed of rigid materials, but preferably is constructed of a material with high magnetic permeability, such as iron, carbon steel or the like.

Figure 4:
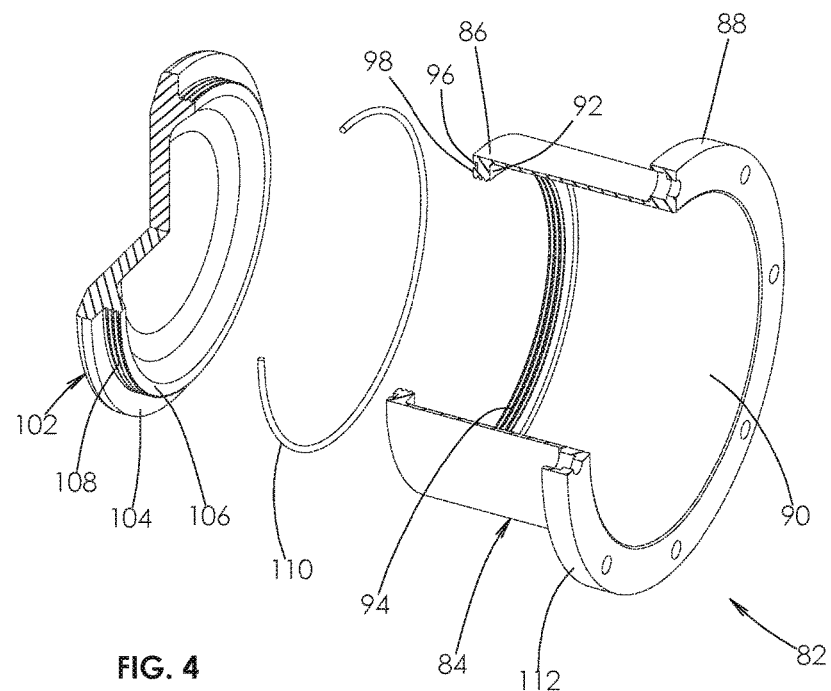
FIG. 4 shows a perspective, exploded, quarter sectioned view of the first example canister assembly of the first example device of FIG. 1.

The pump 12 also includes a generally cup-shaped canister assembly 82 of multi-piece construction, shown in more detail in FIG. 4, which includes a generally tubular single-piece canister body 84 having a first or rear end 86, a second or front end 88 and a central cavity 90 that is open at both ends. Central cavity 90 has a flange 92 that extends inward at the first end 86; the flange 92 includes inward facing threads 94 and a groove 96 in a rearward facing first surface 98.

Canister body 84 may be constructed of any material having electrical conductivity in the range of zero to low, such as from zero to around 800,000 Siemens per meter (S/m). This may include materials having around zero S/m, such as thermoplastic, polymer, silicon carbide, ceramic or other structural composite materials, or the like. Alternatively, it may include certain metals with low electrical conductivity, such as alloy C-22, alloy C-276 or titanium, which may be roughly 590,000 S/m, 590,000 S/m, and 770,000 S/m, respectively, so as to be in a range from zero to about 800,000 S/m. In one preferred embodiment, the canister may be constructed of a structural composite comprising PEEK (Polyetheretherketone) thermoplastic and elongated carbon fibers in the form of several layers of a thin tape wound over a mandrel and having the layers melted together.

Figure 5:
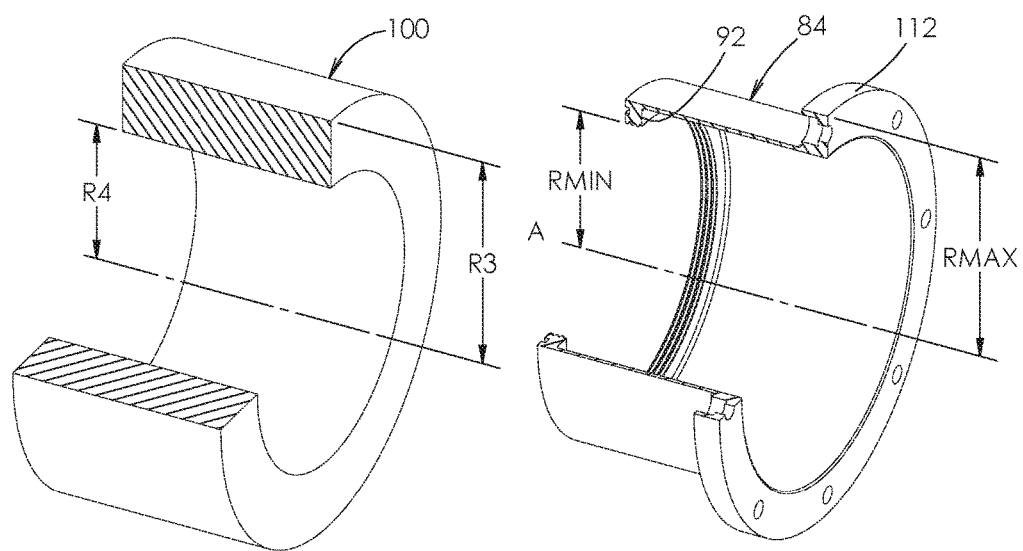
FIG. 5 shows a perspective, quarter sectioned view of the canister body of the first example canister assembly to the right of a tubular piece of raw material used to form a canister body of the first example canister assembly of FIG. 4.

As shown in FIG. 5, canister body 84 is of a generally tubular shape having a central axis A. The shape of canister body 84 includes a dimension RMAX defined by a distance from the central axis A to a point on the canister body 84 farthest away from the central axis A, and a dimension RMIN defined by a distance from the central axis A to a point on the canister body 84 nearest to the central axis A. A ratio of dimension RMIN to RMAX is 0.5 or greater, so that canister body 84 may be machined from a tubular piece of raw material 100 having an outer radius R3 slightly greater than dimension RMAX and an inner radius R4 slightly less than dimension RMIN. With respect to any of the examples provided herein, the ability to machine the material of the body is preferable.

Referring to FIG. 4, canister assembly 82 also includes an end cap 102. End cap 102 has an outward extending flange 104 and a raised portion 106 having outward facing threads 108 that cooperate with the inward facing threads 94 of the canister body flange 92. Canister end cap 102 is removably fastened to canister body flange 92 via engagement of threads 108 and 94. Sealing is provided between canister end cap 102 and canister body flange 92 by an o-ring 110 positioned in canister body flange groove 96 and opposite end cap flange 104, although other methods of sealing may be employed, such as use of a gasket, liquid sealant or the like. Thus, canister end cap 102 sealingly closes canister body central cavity 90 at the body flange 92. The end cap 102 is spaced apart from the casing 22. The end cap 102 may be constructed of rigid materials, such as steel, stainless steel, cast iron or other metallic materials, or structural plastics or the like. The canister end cap 102 is not in proximity to any strong magnetic fields, so the electrical conductivity of the material used is unimportant. Thus, in this first example, the drive magnet assembly 44 is sized to fit inside the canister body 84, the rotor assembly 66 is sized to fit outside the canister body 84, and the first end 86 of the canister body 84 is located at the front end of the canister body 84.

The canister body 84 also includes a flange 112 that extends outward at second end 88. The canister body flange 112 and the casing rear portion 26 are connected together by use of a plurality of fasteners 114 that pass through apertures in the canister body flange 112 and engage threaded holes in a rear surface 116 of the casing rear portion 26. Sealing is provided between casing rear portion 26 and the canister assembly 82 by an o-ring 118, although other methods of sealing may be employed, such as use of a gasket, liquid sealant or the like. Thus, canister assembly 82 is sealingly attached to the casing rear portion 26 and separates a fluid chamber 120 from the outer magnet assembly 44.

The rotor assembly 66 also includes a rotor 122. Rotor 122 includes a rotor shaft portion 124 that further includes a rear portion 126 containing a keyway 128. The inner ring 70 further includes a central opening 130 containing a keyway 132. Inner ring central opening 130 receives rotor shaft rear portion 126. Inner ring 70 and rotor 122 are rotationally locked together by means of a key 134 that is located in keyways 128 and 132.

Casing rear portion 26 includes a central opening 136 that receives a rotor bushing 138. Rotor bushing 138 is attached to casing rear portion central opening 136 via interference fit, although it will be appreciated that the components may be connected in outer suitable ways. Rotor shaft portion 124 includes a front portion 140 having an outer surface 142. Rotor bushing 138 includes an inner surface 144 that is slightly larger than rotor shaft front portion outer surface 142. Rotor bushing inner surface 144 receives and provides a bearing surface for the rotor shaft front portion outer surface 142.

Casing front portion 24 further includes an opening 146 that receives a front portion 148 of an idler pin 150. Idler pin front portion 148 is attached to casing front portion opening 146 via interference fit, although it will be appreciated that the components may be connected in outer suitable ways. Idler pin 150 further includes a rear portion 152 having an outer surface 154.

Pump 12 further includes an idler gear assembly 156. Idler gear assembly 156 includes an idler gear 158 having a central opening 160 and an idler bushing 162 having an outer surface 164. Idler bushing 162 is attached to idler gear central opening 160 via interference fit, although it will be appreciated that the components may be connected in outer suitable ways. Idler bushing 162 further includes an inner surface 166 that is slightly larger than idler pin rear portion outer surface 154. Idler pin rear portion outer surface 154 receives and provides a bearing surface for the idler bushing inner surface 166.

The magnet segments 64 of the outer magnet assembly 44 are in axial alignment with the magnet segments 74 of the inner ring 70. The stationary canister body 84 of the canister assembly 82 is located in a radial gap between the magnet segments 64 of the outer magnet assembly 44 and the magnet segments 74 of the inner ring 70. The alternating polarity of the magnet segments 64 creates an outer magnetic field, and the alternating polarity of the magnet segments 74 creates an inner magnetic field. These two magnetic fields synchronize together to provide a strong magnetic coupling torque between the outer magnet assembly 44 and the rotor assembly 66, such that when the motor 14 is energized, it rotates the motor shaft 48, which rotates the outer magnet assembly 44, which in turn, rotates the rotor assembly 66.

Rotor 122 further includes a rotor head 170 having a plurality of rotor teeth 172. Idler gear 156 further includes a plurality of idler teeth 174 sized to mesh smoothly with the rotor teeth 172. Rotation of the rotor assembly 66 causes rotation of the idler gear assembly 156 through the meshing of rotor teeth 172 and idler gear teeth 174. Rotation of the rotor assembly 66 and idler gear assembly 156 causes a pumping action that moves liquid, the pumping fluid, into the pump through the casing rear portion inlet port 28 and out of the pump through the casing rear portion outlet port 30 via the common internal gear pumping principle that is well known in the industry.

Figure 7:
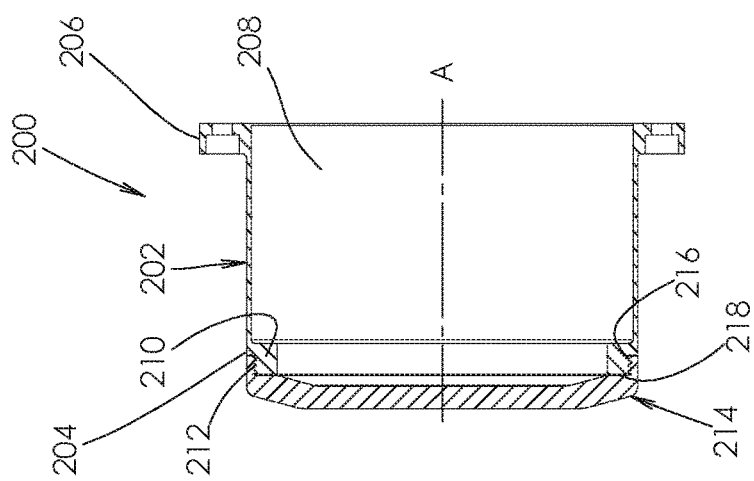
FIG. 7 shows a sectioned view of a second example canister assembly.
Figure 6:
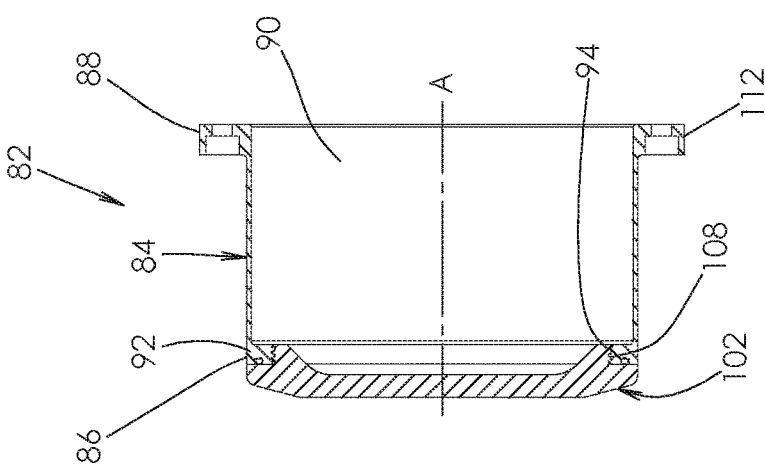
FIG. 6 shows a sectioned view of the first example canister assembly of FIG. 4.
Figure 11:
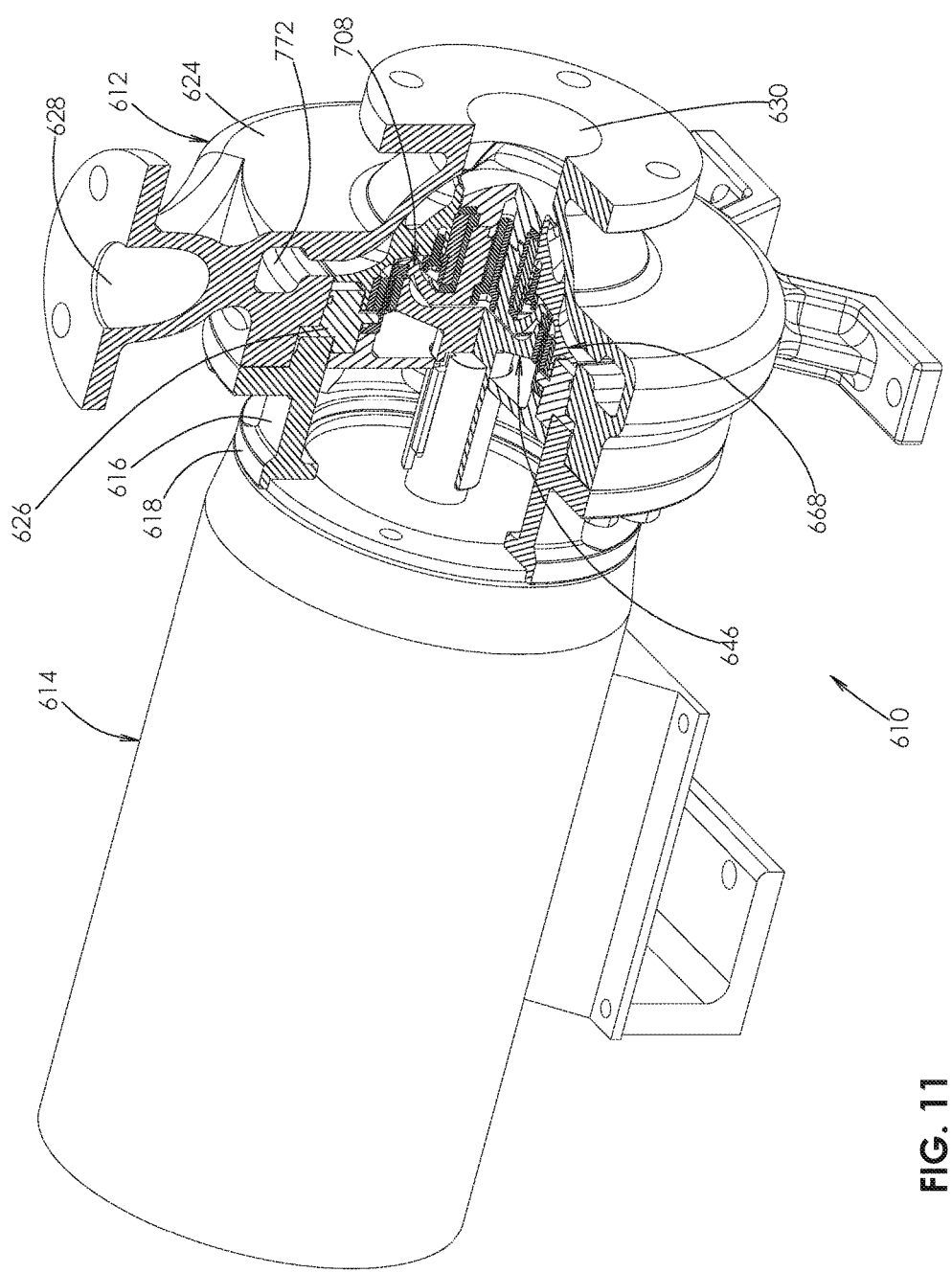
FIG. 11 shows a perspective, quarter-sectioned view of a further example fluid handling device, in a configuration of a centrifugal pump.

FIG. 7 shows a second example canister assembly 200 of multi-piece construction that includes a generally tubular single-piece canister body 202 having a first or rear end 204, a second or front end 206 and a central cavity 208 that is open at both ends. Canister body 202 has a flange 210 that extends inward at the first end 204; the flange 210 includes outward facing threads 212 at the first end 204. Similar to the first example, canister body 202 also includes a flange that extends outward at the second end 206 for connection to a casing. Canister body 202 may be constructed of similar materials to those discussed in reference to the foregoing first example, having zero to low electrical conductivity.

Canister body 202 is of a generally tubular shape similar to canister body 84 previously discussed and shown in FIG. 5, having a central axis A. Similar to the first example, the shape of canister body 202 can be considered to include a dimension RMAX defined by a distance from the central axis A to a point on the canister body 202 farthest away from the central axis A, and a dimension RMIN defined by a distance from the central axis A to the point on the canister body 202 nearest to the central axis A. The ratio of dimension RMIN to RMAX is 0.5 or greater, so as with the first example, the canister body 202 may be machined from a tubular piece of raw material 100 having an outer radius R3 slightly greater than dimension RMAX and an inner radius R4 slightly less than dimension RMIN.

Canister assembly 200 also includes an end cap 214. End cap 214 has inward facing threads 216 that cooperate with the outward facing threads 212 of the canister body flange 210. Canister end cap 214 is fastened to canister body flange 210 via engagement of threads 212 and 216. Sealing is provided between canister end cap 214 and canister body 202 by a gasket 218, although other methods of sealing may be employed, such as use of an o-ring, liquid sealant or the like. Thus, canister end cap 214 sealingly closes canister body central cavity 208 at the first end 204 of the canister body 202 at the body flange 210. The end cap 214 may be constructed of rigid materials, such as steel, stainless steel, cast iron or other metallic materials, or structural plastics or the like. The canister end cap 214 is not in proximity to any strong magnetic fields, so the electrical conductivity of the material used is unimportant.

Figure 8:
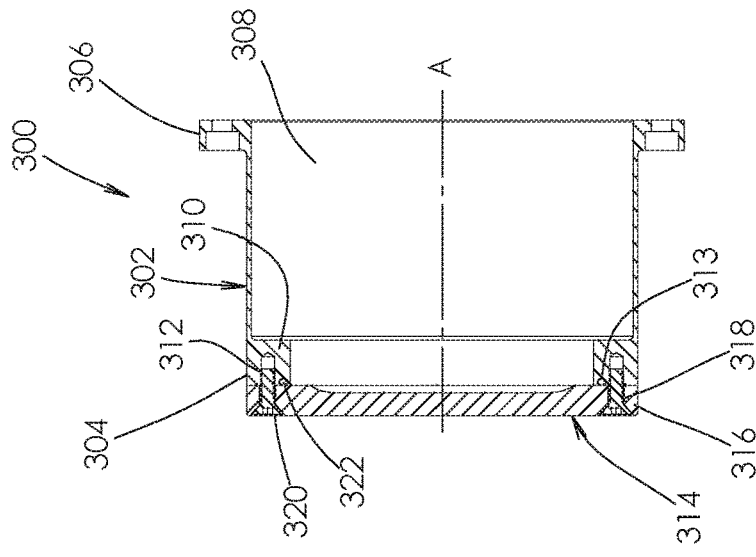
FIG. 8 shows a sectioned view of a third example canister assembly.

FIG. 8 shows a third example canister assembly 300 of multi-piece construction that includes a generally tubular single-piece canister body 302 having a first or rear end 304, a second or front end 306 and a central cavity 308 open at both ends. Canister body 302 has a flange 310 that extends inward at the first end 304 and includes a plurality of threaded apertures 312 and a groove 313. Similar to the first example, canister body 302 also includes a flange that extends outward at the second end 306 for connection to a casing. Canister body 302 may be constructed of similar materials to those discussed in reference to the foregoing first example, having zero to low electrical conductivity.

Canister body 302 is of a generally tubular shape similar to canister body 84 previously discussed and shown in FIG. 5, having a central axis A. Similar to the first example, the shape of canister body 302 can be considered to include a dimension RMAX defined by a distance from the central axis A to a point on the canister body 302 farthest away from the central axis A, and a dimension RMIN defined by a distance from the central axis A to the point on the canister body 302 nearest to the central axis A. The ratio of dimension RMIN to RMAX is 0.5 or greater, so as with the first example, the canister body 302 may be machined from a tubular piece of raw material 100 having an outer radius R3 slightly greater than dimension RMAX and an inner radius R4 slightly less than dimension RMIN.

Canister assembly 300 also includes an end cap 314. End cap 314 has a flange 316 that extends outward and includes a plurality of apertures 318 that cooperate with the threaded apertures 312 of the canister body 302. Canister end cap 314 is fastened to canister body 302 via engagement of a plurality of threaded fasteners 320 that pass through the end cap flange apertures 318 and engage the canister flange threaded apertures 312. Sealing is provided between canister end cap 314 and canister body 302 by an o-ring 322 positioned in canister body groove 313, although other methods of sealing may be employed, such as use of a gasket, liquid sealant or the like. Thus, canister end cap 314 sealingly closes canister body central cavity 308 at the body flange 310. The end cap 314 may be constructed of rigid materials, such as steel, stainless steel, cast iron or other metallic materials, or structural plastics or the like. The canister end cap 314 is not in proximity to any strong magnetic fields, so the electrical conductivity of the material used is unimportant.

FIG. 9 shows a fourth example canister assembly 400 of multi-piece construction that includes a generally tubular single-piece canister body 402 having a first or rear end 404, a second or front end 406 and a central cavity 408 open at both ends. Canister body 402 has a groove 410 in a flange 412 that extends inward at the first end 404. Similar to the first example, canister body 402 also includes a flange that extends outward at the second end 406 for connection to a casing. Canister body 402 may be constructed of similar materials to those discussed in reference to the foregoing first example, having zero to low electrical conductivity.

Canister body 402 is of a generally tubular shape similar to canister body 84 previously discussed and shown in FIG. 5, having a central axis A. Similar to the first example, the shape of canister body 402 can be considered to include a dimension RMAX defined by a distance from the central axis A to a point on the canister body 402 farthest away from the central axis A, and a dimension RMIN defined by a distance from the central axis A to the point on the canister body 402 nearest to the central axis A. The ratio of dimension RMIN to RMAX is 0.5 or greater, so as with the first example, the canister body 402 may be machined from a tubular piece of raw material 100 having an outer radius R3 slightly greater than dimension RMAX and an inner radius R4 slightly less than dimension RMIN.

Canister assembly 400 also includes an end cap 414 having a flange 416 that extends outward and includes a plurality of threaded apertures 418 and a clamp ring 420 having a plurality of apertures 422 that cooperate with the threaded apertures 418 of the end cap 414. End cap 414 is positioned adjacent the rear side of canister body flange 412 and clamp ring 420 is positioned adjacent the front side of canister body flange 412, although the positions of the end cap 414 and clamp ring 420 may be reversed.

End cap 414, clamp ring 420 and canister body 402 are fastened together via engagement of a plurality of threaded fasteners 424 that pass through the clamp ring apertures 422 and engage the end cap threaded apertures 418, which clamp the canister body flange 412 between the end cap 414 and the clamp ring 420. Sealing is provided between canister end cap 414 and canister body 402 by an o-ring 426 positioned in canister body groove 410, although other methods of sealing may be employed, such as use of a gasket, liquid sealant or the like. Thus, canister end cap 414 sealingly closes canister body central cavity 408 at the canister body flange 412. The end cap 414 and clamp ring 420 may be constructed of rigid materials, such as steel, stainless steel, cast iron or other metallic materials, or structural plastics or the like. The canister end cap 414 and clamp ring 420 are not in proximity to any strong magnetic fields, so the electrical conductivity of the material used is unimportant.

FIG. 10 shows a fifth example canister assembly 500 of multi-piece construction that includes a generally tubular single-piece canister body 502 having a first or rear end 504, a second or front end 506 and a central cavity 508 open at both ends. Canister body 502 further includes a flange 510 that extends inward at the first end 504. Similar to the first example, canister body 502 also includes a flange that extends outward at the second end 506 for connection to a casing. Canister body 502 may be constructed of similar materials to those discussed in reference to the foregoing first example, having zero to low electrical conductivity.

Canister body 502 is of a generally tubular shape similar to canister body 84 previously discussed and shown in FIG. 5, having a central axis A. Similar to the first example, the shape of canister body 502 can be considered to include a dimension RMAX defined by a distance from the central axis A to a point on the canister body 502 farthest away from the central axis A, and a dimension RMIN defined by a distance from the central axis A to the point on the canister body 502 nearest to the central axis A. The ratio of dimension RMIN to RMAX is 0.5 or greater, so as with the first example, the canister body 502 may be machined from a tubular piece of raw material 100 having an outer radius R3 slightly greater than dimension RMAX and an inner radius R4 slightly less than dimension RMIN.

Canister assembly 500 also includes an end cap 514. Canister end cap 514 has a flange 516 that extends outward and at which end cap 514 is fastened and sealed to canister body flange 510 via an adhesive. Thus, canister end cap 514 sealingly closes canister body central cavity 508 at the canister body flange 510. Locating the end cap 514 within the central cavity 508 and to be stopped and sealed against the canister body flange 510 ensures that pressures within the central cavity 508 do not try to unseal the canister assembly 500. The end cap 514 may be constructed of rigid materials, such as steel, stainless steel, cast iron or other metallic materials, or structural plastics or the like. The canister end cap 514 is not in proximity to any strong magnetic fields, so the electrical conductivity of the material used is unimportant.

Referring to a further example embodiment, in FIGS. 11-14, an example magnetically coupled fluid handling device 610 is shown in the form of a pump 612 connected to a standard C-face electric motor 614. The configuration of magnetically coupled fluid handling device 610 happens to be in the form of a centrifugal pump with a magnetic coupling of an inner drive arrangement, and where a canister end cap provides support for a rotor. Pump 612 includes a motor adapter 616 having a first flange 618 that extends outward and is connected to the motor 614 by use of a plurality of fasteners, such as threaded screws or other suitable means of connection.

The pump 612 includes a casing 622 that is intended to be mounted in place, so as to be stationary. The casing 622 includes a front portion 624 and a rear portion 626. The casing front portion 624 also has an outlet or discharge port 628 and an inlet port 630. In this further example, the discharge port 628 is radially facing, while the inlet port 630 is axially facing, although alternative configurations may be utilized. The casing front portion 624 includes a rear face 632 that is connected to a second flange 634 of the motor adapter 616 by use of a plurality of fasteners that pass through apertures in the second flange 634 and engage threaded holes in the casing front portion rear face 632. The casing 622 may be constructed of rigid materials, such as steel, stainless steel, cast iron or other metallic materials, or structural plastics or the like.

Casing rear portion 626 has a flange 638 that extends outward. The casing rear portion flange 638 is clamped between the casing front portion 624 and the motor adapter 616 when connecting the pump 612 to the motor adapter 616 by installing the fasteners 632. Sealing is provided between the casing front portion 624 and the casing rear portion 638 by an o-ring 640, although other methods of sealing may be employed, such as use of a gasket, liquid sealant or the like. The pump 612 also includes a rear cover 642 that has a flange 644 that extends outward. The rear cover 642 is connected to the casing rear portion 626 by use of a plurality of fasteners, such as threaded screws that pass through apertures in the rear cover 642 and engage threaded holes in a rear face of the casing rear portion 626.

The pump 612 further includes a rotatable drive magnet assembly, such as an inner magnet assembly 646 that includes an inner ring 648 connected directly to a shaft 650 of the motor 614. Inner ring 648 includes an inner opening 652 that slidably receives the motor shaft 650. The inner ring 648 also includes a keyway 654 and may include one or more threaded apertures to receive set screws to provide a positive axial connection between the inner ring 648 and the motor shaft 650. A key 656 is positioned in the inner ring keyway 654 and engages with a keyway 658 of the motor shaft 650 to provide a positive rotational connection between the inner ring 648 and the motor shaft 650. The inner ring 648 may be constructed of rigid materials, but is preferably constructed of a material with high magnetic permeability, such as iron, carbon steel or the like.

The inner ring 648 of the drive magnet assembly, such as inner magnet assembly 646 includes an outer surface 660 to which are connected twenty-four magnet segments 662, although it will be appreciated that one may construct an embodiment with a different quantity of magnet segments. The magnet segments 662 are radially charged and are positioned with alternating polarity. The magnet segments 662 are rigidly connected to the inner ring 648 using an adhesive, although alternative suitable means of connection may be used, such as use of fasteners or the like. Although not required, this example embodiment includes an inner magnet sleeve 664 having a thin cylindrical portion 666 that closely fits over the outer surfaces of the magnet segments 662.

The pump 612 also includes a rotatable rotor assembly, such as a rotatable rotor or impeller assembly 668 that includes a rotor, such as an impeller 670. The impeller 670 includes a rear opening 672, which receives an outer ring 674 having an inner wall surface 676 to which are connected twenty-four magnet segments 678, which corresponds to the number connected to the inner ring 648, although it will be appreciated that one may construct an embodiment with a greater or lesser quantity of magnet segments. The magnet segments 678 are radially charged and are positioned with alternating polarity. The magnet segments 678 are rigidly connected to the outer ring 674 using an adhesive, although alternative suitable means of connection may be used, such as use of fasteners or the like. An impeller magnet sleeve 680 is included having a thin cylindrical portion 682 that closely fits along the inner surfaces of the magnet segments 678. The impeller magnet sleeve 680 also includes a rear flange 684 that extends outward. The impeller magnet sleeve 680 is sealingly connected to the impeller 670 by continuous weld joints located at an outer end of the rear flange 684 and at a front end of the cylindrical portion 682. It will be appreciated by one of skill in the art that other methods of connection may be used, such as liquid adhesive, gaskets, o-rings or the like. The rotor or impeller 670 may be constructed of rigid materials, such as steel, stainless steel, cast iron or other metallic materials, or structural plastics or the like. The outer ring 674 may be constructed of rigid materials, but preferably is constructed of a material with high magnetic permeability, such as iron, carbon steel or the like.

Figure 13:
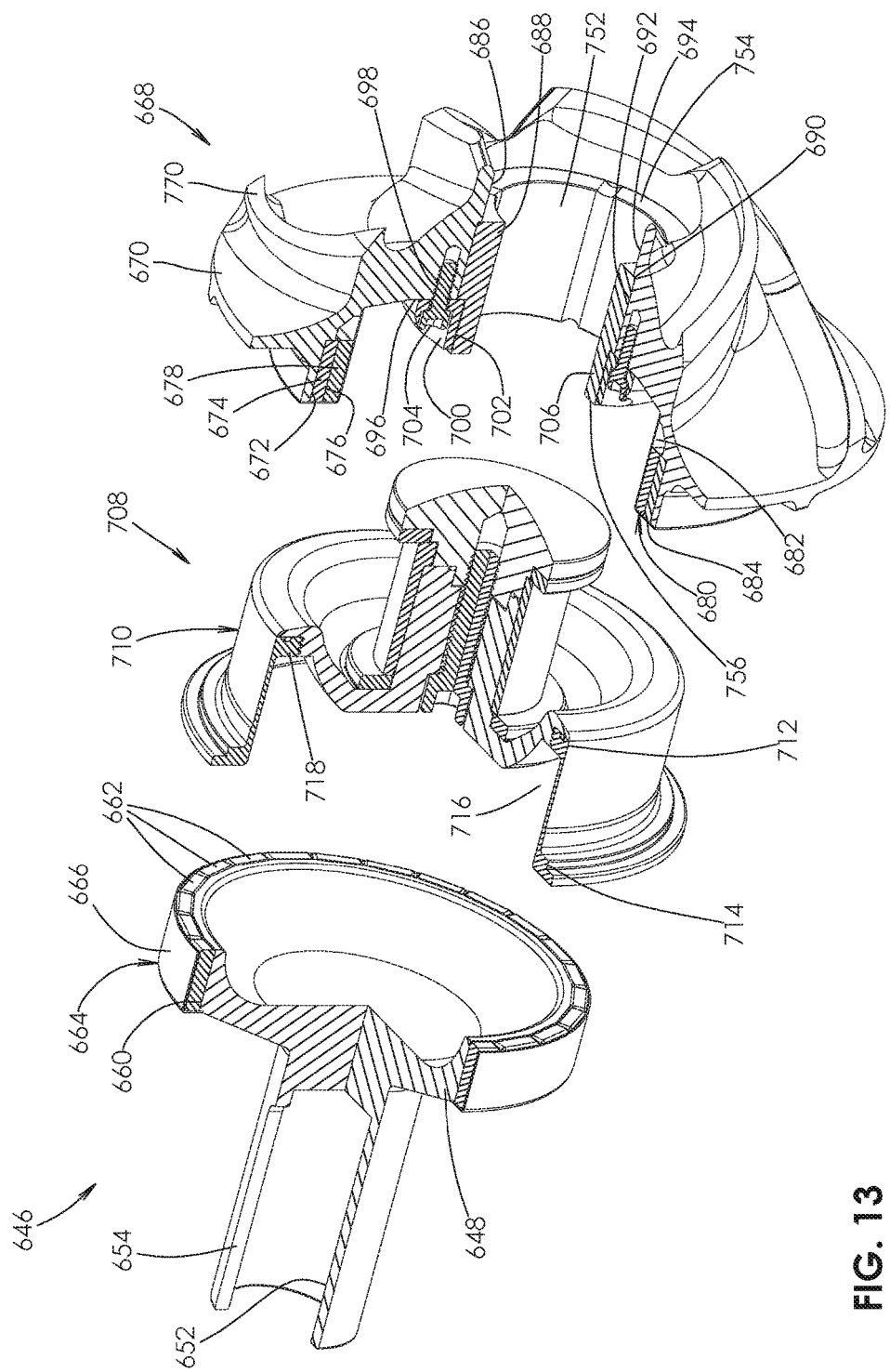
FIG. 13 shows a perspective, quarter-sectioned partially exploded view of a drive magnet assembly, canister assembly and rotor assembly of the further example device of FIGS. 11-12.
Figure 14:
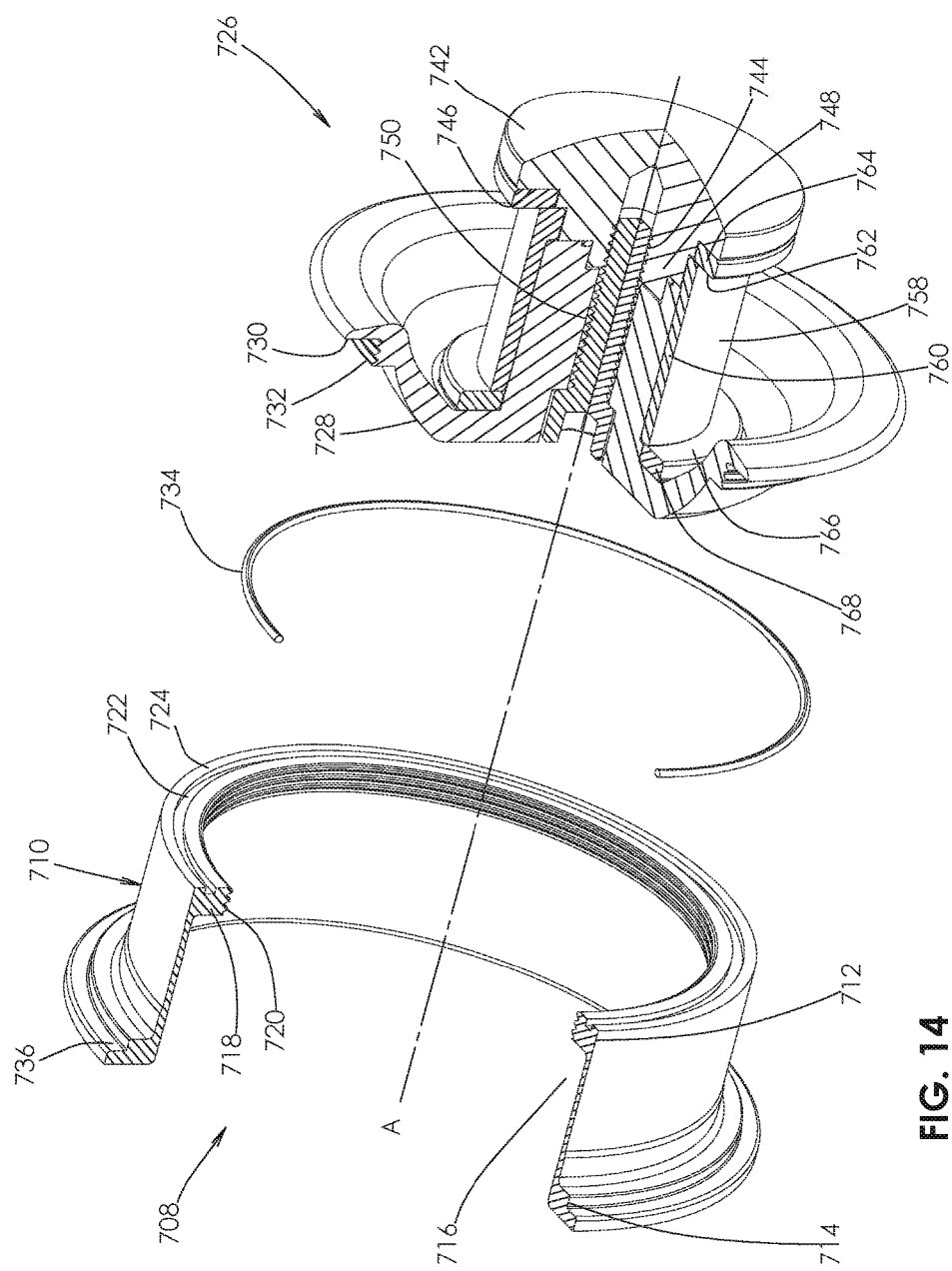
FIG. 14 shows a perspective, quarter-sectioned partially exploded view of the canister assembly of the further example device of FIG. 13.

Referring to FIGS. 13-14, the impeller 670 has a central opening 686. A bushing 688 is received in the central opening 686 of the rotor or impeller 670. The bushing 688 is held in a forward direction against a step 690 in the central opening 686 proximate an end of the central opening 686 of the impeller 670, where there is a transition from a first inner surface 692 to a second inner surface 694 having a smaller diameter. The rotor or impeller 670 further includes a rear surface 696 that includes one or more threaded holes 698. An impeller rear cap, such as rotor ring 700 having a central opening 702 is connected to the impeller rear surface 696 by at least one fastener 704, such as by a plurality of screws that pass through apertures in the rotor ring 700 and engage the threaded holes in the impeller 670. The bushing 688 includes a rear portion 706 with a shape that is not cylindrical, and it corresponds to a non-cylindrical shape of the central opening 702 in the rotor ring 700 to prevent relative rotation between the bushing 688, rotor ring 700 and impeller 670, although as previously noted, alternative ways of preventing relative rotation may be utilized. Thus, the bushing 688 fits inside the central opening 686 extending axially through the rotor or impeller 670 and is held in place between the rotor ring 700 and the step 690 in the central opening 686 of the impeller 670.

The pump 612 also includes a generally cup-shaped canister assembly 708 of multi-piece construction that includes a generally tubular single-piece canister body 710 having a first or front end 712, a second or rear end 714 and a central cavity 716 open at both ends. Canister body 710 has a flange 718 that extends inward and inward facing threads 720 at the first end 712 and a groove 722 at a first surface 724. Canister body 710 may be constructed of similar materials to those discussed in reference to the foregoing first example, having zero to low electrical conductivity.

As shown in FIG. 14, canister body 710 is of a generally tubular shape having a central axis A. Similar to the first example, the shape of canister body 710 can be considered to include a dimension RMAX defined by a distance from the central axis A to a point on the canister body 710 farthest away from the central axis A, and a dimension RMIN defined by a distance from the central axis A to a point on the canister body 710 nearest to the central axis A. A ratio of dimension RMIN to RMAX is 0.5 or greater, so as with the first example, the canister body 710 may be machined from a tubular piece of raw material 100 having an outer radius R3 slightly greater than dimension RMAX and an inner radius R4 slightly less than dimension RMIN.

Canister assembly 708 also includes an end cap assembly 726 having an end plate 728. End plate 728 has a flange 730 that extends outward and outward facing threads 732 that cooperate with the inward facing threads 720 of the canister body flange 718. Canister end cap assembly 726 is fastened to canister body 710 via engagement of threads 720 and 732. Sealing is provided between canister end cap assembly 726 and canister body flange 718 by an o-ring 734, although other methods of sealing may be employed, such as use of a gasket, liquid sealant or the like. Thus, canister end cap assembly 726 sealingly closes canister body central cavity 716 at the canister body flange 718. The end cap assembly 726 is spaced apart from the casing 622.

The canister body 710 also includes a flange 736 that extends outward at second end 714. The canister body flange 736 is clamped between the casing rear portion 726 and the rear cover 642 when connecting the rear cover 642 to the casing rear portion 726 by installing the fasteners 632. Sealing is provided between casing rear portion 726 and the canister assembly 708 by an o-ring 738, although other methods of sealing may be employed, such as use of a gasket, liquid sealant or the like. Thus, canister assembly 708 is sealingly attached to the casing rear portion 726 and separates a fluid chamber 740 from the inner magnet assembly 646.

Canister end cap assembly 726 also includes a nose cap 742, which has a threaded aperture 744, a rear face 746 and a rear extended portion 748. The nose cap 742 is attached to the canister end plate 728 by a fastener 748, such as a threaded screw that passes through an aperture 750 in the end plate 728 and engages the threaded aperture 744 in the rear of the nose cap 742. In this further example embodiment, there is just one fastener 748 securing the nose cap 742, but it will be appreciated by one of skill in the art that a plurality of fasteners or other suitable fastening means may be employed in assembling the components of the canister end cap assembly 726. Also, in this further example pump 612, the canister end cap assembly 726 is spaced from the casing front portion 624, such that it does not receive support from and is not compressed by the casing front portion 624. The end plate 728 and nose cap 742 may be constructed of rigid materials, such as steel, stainless steel, cast iron or other metallic materials, or structural plastics or the like. The canister end cap assembly 726 is not in proximity to any strong magnetic fields, so the electrical conductivity of the material used is unimportant. Thus, in this further example, the drive magnet assembly 646 is sized to fit outside the canister body 710, the rotor assembly 668 is sized to fit inside the canister body 710, and the first end 712 is located at the rear end of the canister body 710.

Within this further example pump 612, the bushing 688 provides the rotatable rotor assembly or impeller assembly 668 a radial bearing surface 752, a first or front axial bearing surface 754, and a second or rear axial bearing surface 756. In this further example, these bearing surfaces engage respective bearing surfaces of the canister end cap assembly 726, which include a radial bearing surface 758 provided by a bearing sleeve 760, a first or front axial bearing surface 762 provided by a front thrust washer 764, and a second or rear axial bearing surface 766 provided by a rear thrust washer 768. It should be appreciated that alternatively, bearing surfaces 766 and 758 could be integral with canister end plate 728, and/or bearing surface 762 could be integral with nose cap 742. As such, canister end cap assembly 726 provides support for the rotor assembly 668.

The magnet segments 662 of the inner magnet assembly 646 are in axial alignment with the magnet segments 678 impeller assembly 668. The stationary canister body 710 of the canister assembly 708 is located in a radial gap between the magnet segments 662 of the inner magnet assembly 646 and the magnet segments 678 of the rotor assembly 668. The alternating polarity of the magnet segments 662 creates an inner magnetic field, and the alternating polarity of the magnet segments 678 creates an outer magnetic field. These two magnetic fields synchronize together to provide a strong magnetic coupling torque between the inner magnet assembly 646 and the impeller assembly 668, such that when the motor 614 is energized, it rotates the motor shaft 650, which rotates the inner magnet assembly 646, which in turn, rotates the impeller assembly 668.

Figure 12:
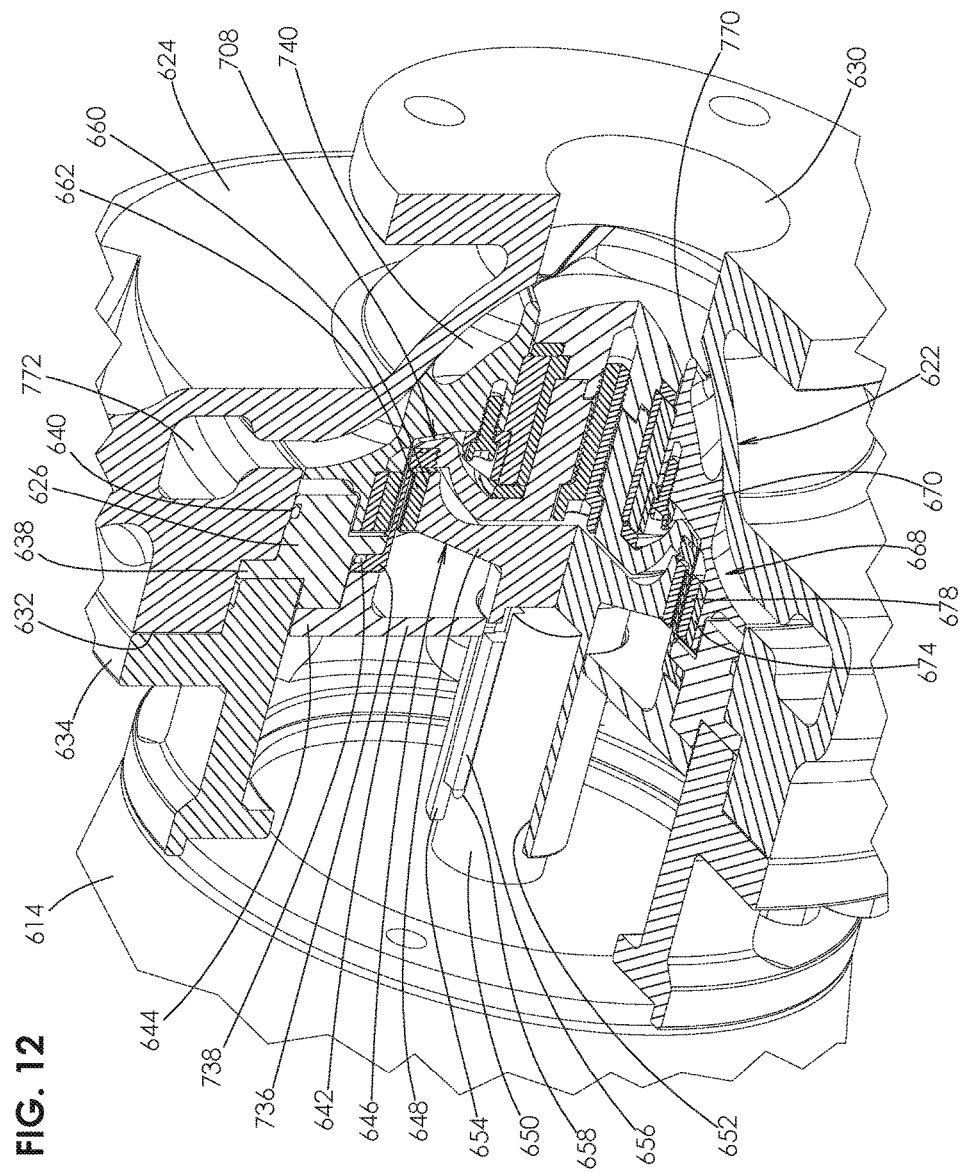
FIG. 12 shows an enlarged closer perspective view of the quarter-sectioned area of FIG. 11.

Referring to FIGS. 12-13, the impeller 670 includes a plurality of vanes 770. The casing front portion 624 includes a discharge collector cavity 772 that is fluidly connected to the casing discharge port 628. The rotation of the impeller vanes 770 causes a pumping action that moves liquid, the pumping fluid, into the pump through the casing inlet port 730, radially outward to the discharge collector cavity 772, and out of the pump through the discharge port 728.

The invention claimed is:

1. A magnetically driven fluid handling device comprising:
   a stationary casing having a front portion, a rear portion, a discharge port, and an inlet port;
   a rotatable rotor assembly having a plurality of magnet segments;
   a rotatable drive magnet assembly having a plurality of magnet segments in axial alignment with the magnet segments of the rotor assembly;
   a stationary canister assembly of multi-piece construction further comprising an end cap and a body that is generally tubular, with the body being disposed within a radial gap between the magnet segments of the rotor assembly and the magnet segments of the drive magnet assembly;
   wherein the body has a central axis and further comprises a central cavity that is open at opposed first and second ends, with a dimension RMAX defined by a radial distance from the central axis to a point on the body farthest away from the central axis, and a dimension RMIN defined by a radial distance from the central axis to a point on the body nearest to the central axis, wherein the dimensions RMIN and RMAX have a ratio of RMIN to RMAX that is at least 0.5, and the body is a single piece; and
   wherein the body further comprises a flange at the first end, the flange at the first end of the body extends inward and further comprises threads, the end cap further comprises threads that cooperate with the threads of the flange at the first end of the body, and the end cap is fastened to and sealingly closes the central cavity at the flange at the first end of the body via engagement of the respective threads of the flange at the first end of the body and the end cap, and wherein the canister assembly is sealingly attached to the casing at the second end of the body, and the canister assembly separates a fluid chamber within the casing from the drive magnet assembly.

2. The fluid handling device of claim 1, wherein the fluid handling device is a pump.

3. The fluid handling device of claim 1, wherein the body is constructed of material comprising PEEK (Polyetheretherketone) thermoplastic and elongated carbon fibers.

4. The fluid handling device of claim 3, wherein the material of which the body is constructed further comprises several layers of a thin tape that are melted together.

5. The fluid handling device of claim 4, wherein the layers of the thin tape have been wound over a mandrel before being melted together.

6. The fluid handling device of claim 1, wherein the body is constructed of material having electrical conductivity in the range of zero to 800,000 Siemens per meter.

7. The fluid handling device of claim 1, wherein the drive magnet assembly is sized to fit inside the body, the rotor assembly is sized to fit outside the body, and the first end of the body is located at the front end of the body.

8. The fluid handling device of claim 1, wherein the end cap further comprises a bearing surface for the rotor assembly.

9. The fluid handling device of claim 8, wherein the bearing surface of the end cap further comprises a radial bearing surface for the rotor assembly.

10. The fluid handling device of claim 8, wherein the bearing surface of the end cap further comprises a front axial bearing surface for the rotor assembly.

11. The fluid handling device of claim 8, wherein the bearing surface of the end cap further comprises a rear axial bearing surface for the rotor assembly.

12. The fluid handling device of claim 1, wherein the end cap is constructed of metal.

13. The fluid handling device of claim 1, wherein the end cap is spaced apart from the casing.

14. A canister assembly for a magnetically driven fluid handling device, said canister assembly being of multi-piece construction and comprising:
   an end cap and a body that is generally tubular;
   the body having a central axis and a central cavity that is open at opposed first and second ends, with a dimension RMAX defined by a radial distance from the central axis to a point on the body farthest away from the central axis, and a dimension RMIN defined by a radial distance from the central axis to a point on the body nearest to the central axis, wherein the dimensions RMIN and RMAX have a ratio of RMIN to RMAX that is at least 0.5, and the body is a single piece; and
   wherein the body further comprises a flange at the first end, the flange at the first end of the body extends inward and further comprises threads, the end cap further comprises threads that cooperate with the threads of the flange at the first end of the body, and the end cap is fastened to and sealingly closes the central cavity at the flange at the first end of the body via engagement of the respective threads of the flange at the first end of the body and the end cap.

15. The canister assembly of claim 14, wherein the body is constructed of material comprising PEEK (Polyetheretherketone) thermoplastic and elongated carbon fibers.

16. The canister assembly of claim 15, wherein the material of which the body is constructed further comprises several layers of a thin tape that are melted together.

17. The canister assembly of claim 16, wherein the layers of the thin tape have been wound over a mandrel before being melted together.

18. The canister assembly of claim 14, wherein the body is constructed of material having electrical conductivity in the range of zero to 800,000 Siemens per meter.

19. The canister assembly of claim 14, wherein the end cap is constructed of metal.

20. A magnetically driven fluid handling device comprising:
   a stationary casing having a front portion, a rear portion, a discharge port, and an inlet port;
   a rotatable rotor assembly having a plurality of magnet segments;
   a rotatable drive magnet assembly having a plurality of magnet segments in axial alignment with the magnet segments of the rotor assembly;
   a stationary canister assembly of multi-piece construction further comprising an end cap and a body that is generally tubular, with the body being disposed within a radial gap between the magnet segments of the rotor assembly and the magnet segments of the drive magnet assembly, and the end cap further comprising a bearing surface for the rotor assembly;
   wherein the body has a central axis and further comprises a central cavity that is open at opposed first and second ends, with a dimension RMAX defined by a radial distance from the central axis to a point on the body farthest away from the central axis, and a dimension RMIN defined by a radial distance from the central axis to a point on the body nearest to the central axis, wherein the dimensions RMIN and RMAX have a ratio of RMIN to RMAX that is at least 0.5, and the body is constructed of a single piece of material; and
   wherein the body further comprises a flange at the first end, the flange at the first end of the body extends inward and the end cap is fastened to and sealingly closes the central cavity at the flange at the first end of the body, and wherein the canister assembly is sealingly attached to the casing at the second end of the body, and the canister assembly separates a fluid chamber within the casing from the drive magnet assembly.

21. The fluid handling device of claim 20, wherein the fluid handling device is a pump.

22. The fluid handling device of claim 20, wherein the body is constructed of material comprising PEEK (Polyetheretherketone) thermoplastic and elongated carbon fibers.

23. The fluid handling device of claim 22, wherein the material of which the body is constructed further comprises several layers of a thin tape that are melted together.

24. The fluid handling device of claim 23, wherein the layers of the thin tape have been wound over a mandrel before being melted together.

25. The fluid handling device of claim 20, wherein the body is constructed of material having electrical conductivity in the range of zero to 800,000 Siemens per meter.

26. The fluid handling device of claim 20, wherein the drive magnet assembly is sized to fit inside the body, the rotor assembly is sized to fit outside the body, and the first end of the body is located at the front end of the body.

27. The fluid handling device of claim 20, wherein the end cap is constructed of metal.

28. The fluid handling device of claim 20, wherein the bearing surface of the end cap further comprises a radial bearing surface for the rotor assembly.

29. The fluid handling device of claim 20, wherein the bearing surface of the end cap further comprises a front axial bearing surface for the rotor assembly.

30. The fluid handling device of claim 20, wherein the bearing surface of the end cap further comprises a rear axial bearing surface for the rotor assembly.

* * * * *